United States Patent [19]

Chikano et al.

[11] Patent Number: 4,621,889
[45] Date of Patent: Nov. 11, 1986

[54] CAMERA FILTER

[75] Inventors: Mitsuo Chikano; Yuji Nakajima, both of Tokyo, Japan

[73] Assignee: Hoya Corporation, Tokyo, Japan

[21] Appl. No.: 711,552

[22] Filed: Mar. 14, 1985

Related U.S. Application Data

[63] Continuation-in-part of Ser. No. 532,129, Sep. 14, 1983, abandoned.

[30] Foreign Application Priority Data

Sep. 14, 1982 [JP] Japan .......................... 57-138443[U]

[51] Int. Cl.$^4$ ............................ G02B 5/22; G02B 5/28
[52] U.S. Cl. ..................................... 350/1.6; 350/316; 350/318
[58] Field of Search ................. 350/316, 318, 1.6, 166

[56] References Cited

U.S. PATENT DOCUMENTS

| 1,971,434 | 8/1934 | Trautmann | 350/318 |
| 3,551,017 | 12/1970 | Iwasaki et al. | 350/1.6 |
| 3,758,200 | 9/1973 | Saito | 350/318 |
| 4,311,364 | 1/1982 | Motomura et al. | 350/318 |

FOREIGN PATENT DOCUMENTS 279952  4/1952  Switzerland .......................... 350/316

Primary Examiner—Bruce Y. Arnold
Attorney, Agent, or Firm—Sughrue, Mion, Zinn, Macpeak, and Seas

[57] ABSTRACT

A camera filter is provided with an ultraviolet ray absorbing substrate, on which is deposited an evaporated film which transmits blue and green light, but which sharply attenuates a portion of the red light in the higher wavelength range. Particularly, the wavelength at which the transmission factor reaches 50% is in a range from 640 to 700 nm. The evaporated film is formed on one surface of the substrate, typically the inner surface thereof relative to the camera lens, and the filter is fitted to a frame which may be suitably attached to the camera lens.

7 Claims, 9 Drawing Figures

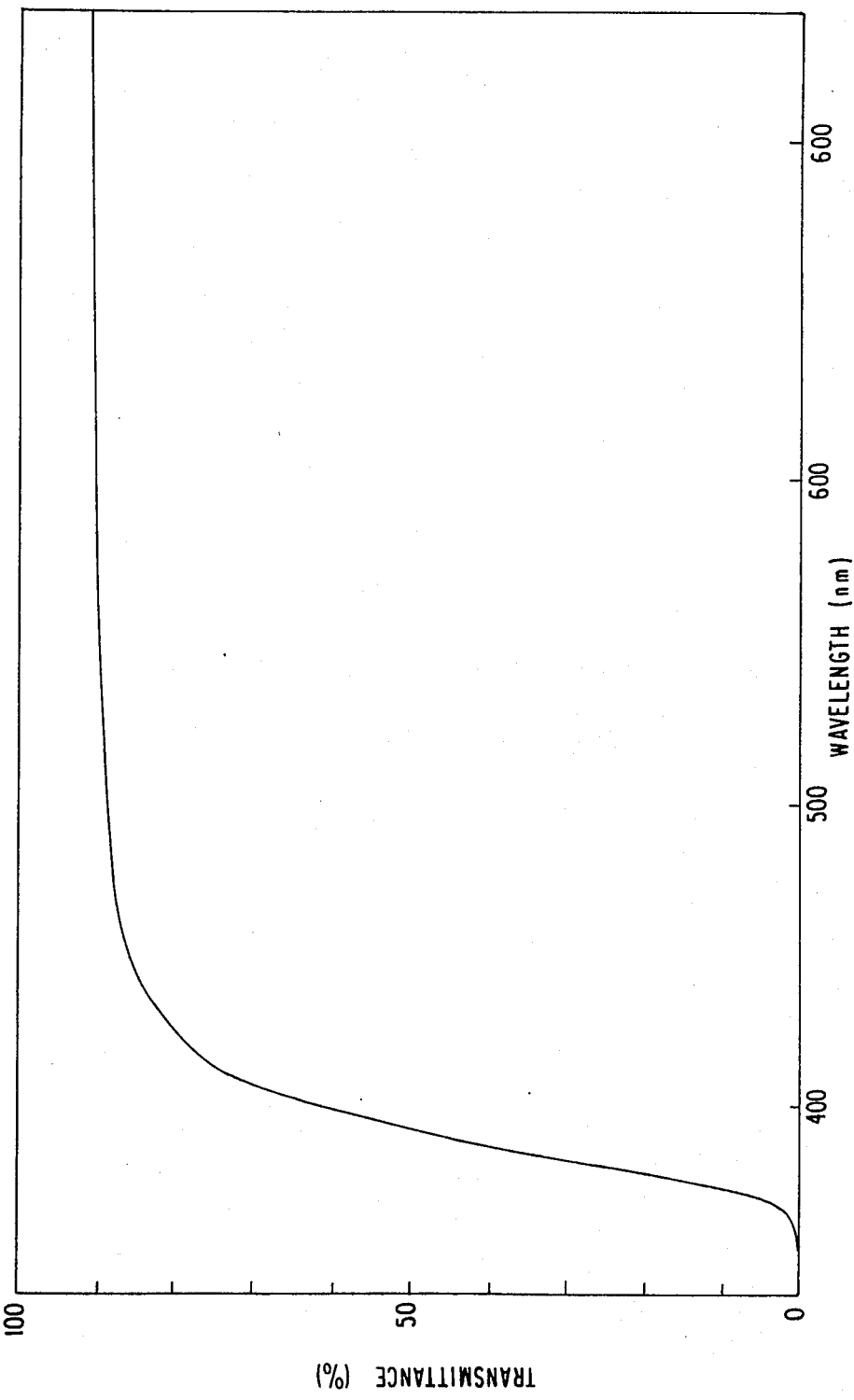
FIG. 8. SPECTRAL TRANSMITTANCE CURVE OF ULTRAVIOLET RAY ABSORBING GLASS

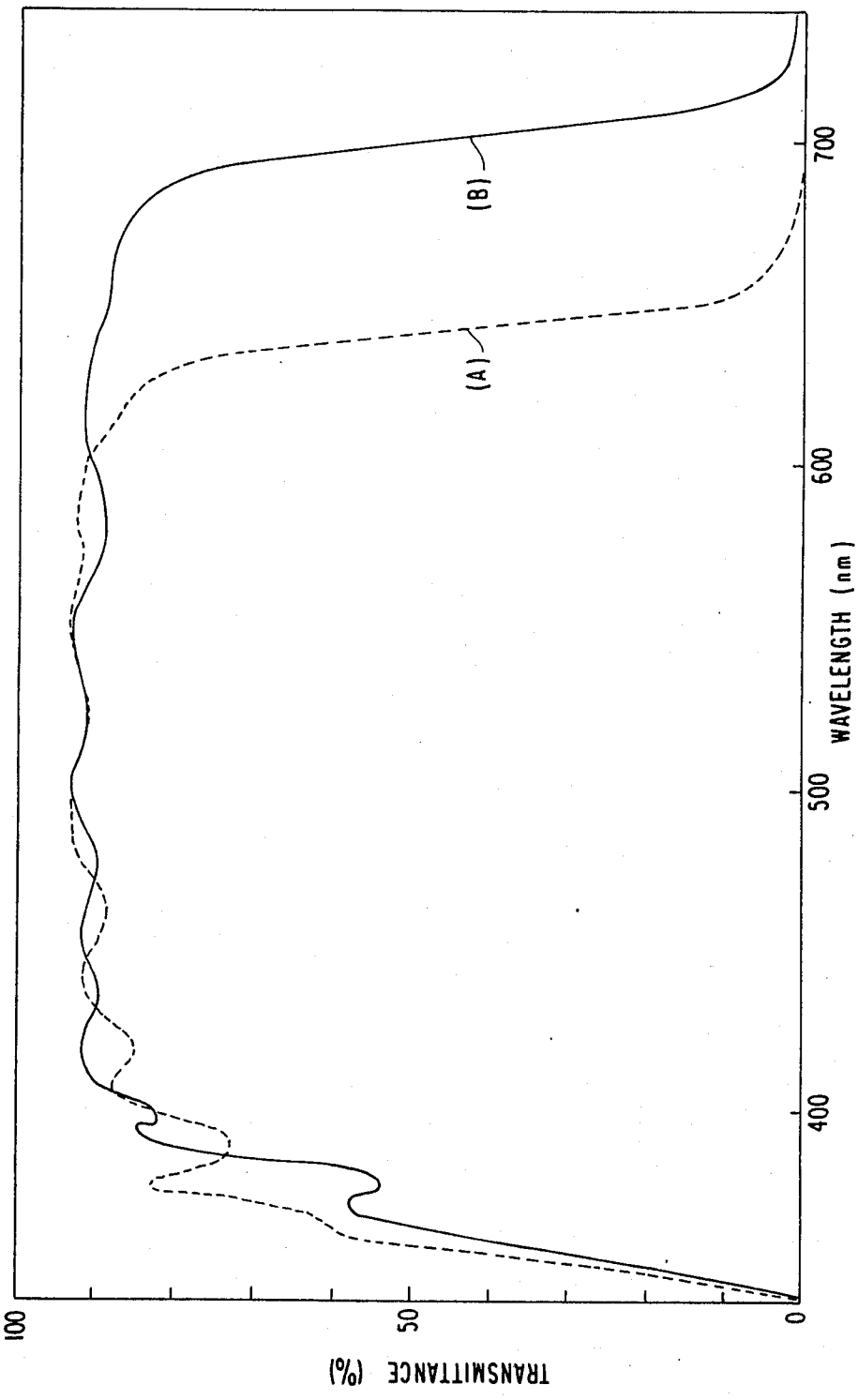
FIG. 9 SPECTRAL TRANSMITTANCE CURVE OF GLASS PLATE & EVAPORATION FILM

CAMERA FILTER

This is a continuation-in-part of application Ser. No. 532,129, filed Sept. 14, 1983, now abandoned.

BACKGROUND OF THE INVENTION

The present invention relates to a camera filter which absorbs a portion of the ultraviolet region of the spectrum, while blocking a portion of the red region of the spectrum.

An ultraviolet ray absorbing filter has been conventionally used in order to prevent blue fogging of color film which could otherwise be caused due to the presence of ultraviolet rays. In addition, there have been separately known contrasting red light transmitting filters and color compensating cyanic filters, which act upon the red portion of the spectrum.

The conventional red spectrum transmitting filter is formed of a colored glass or a dyed plastic or gelatin. This filter absorbs light in a range of wavelengths short in comparison with red light, and transmits light at wavelengths which are long in comparison with red light. The spectral transmission curves of such filters are typically within the range between the curves shown in FIG. 3. As is evident from this Figure, the transmission factor of such filters increases dramatically as the wavelength of the incoming light exceeds 600 nm. Filters having characteristics such as shown in FIG. 3 have been primary used in order to bring about a contrasting effect with black and white film.

The conventional cyanic filter transmits light in a range of wavelengths which are short in comparison with red light, and varies the degree of transmission in the red light region. FIG. 4 shows the range of transmission factor characteristics of typical cyanic filters. Such filters are primarily used in order to vary the color balance of a picture photographed with color film, or in order to compensate for an insufficiency in the spectral characteristics of the light source. The filter media is typically a dyed gelatin. Although these filters attenuate the red spectra to some degree, there has not previously been known a filter which blocks red light at wavelengths in excess of those that can be readily perceived by the human eye, resulting in the drawbacks which will be described in more detail below.

Presently, a number of organic dyes very frequently used in various kinds of fabrics strongly reflect red or infrared light. For the most part, this light can not be sensed by human eyes. The spectral composition of a color stimulus in color theory, as seen by human eyes, is as shown in FIG. 5, when indicated using the three spectral stimulus values of the CIE (Committee of International Illumination). The three curves shown in FIG. 5 illustrate the three primary colors $\bar{x}$ (blue), $\bar{y}$ (green) and $\bar{z}$ (red). For example, $\bar{x}$ is representative of the degree to which human eyes will detect light at a certain wavelength as a blue stimulus. Similarly, $\bar{z}$ in FIG. 5 is representative of the degree of red sensitivity. With respect to red light having a wavelength of greater than about 650 nm, the degree to which human eyes perceive this light is very limited. Above about 680 nm, light is no longer perceived by the human eyes.

FIG. 6 illustrates the spectral sensitivity curves of the three emulsion layers of color film. As is evident from FIG. 6, the red sensitivity curve exhibits a peak in the neighborhood of 650 nm, indicating that the color film is quite sensitive to incoming light at around this wavelength. Therefore, color film is quite sensitive to red and infrared light which is scarcely perceived by the human eyes. Accordingly, color film strongly senses the reflected red or infrared light referred to above, that is, that light reflected by fabrics impregnated with certain organic dyes.

This influence is outstanding in fabrics perceived as having a green or dark green color. Referring to FIG. 7, the spectral reflection characteristic curves of typical such dyed fabrics are illustrated. As can be determined from FIG. 7, these dyed fabrics very strongly reflect light in the red and near infrared range. When fabrics having reflection factors as indicated in FIG. 7 are photographed, their colors are photographically reproduced either as grey or as a warm color (inclined toward red or orange). That is, although the fabric may appear green or dark green to human eyes, this color is reproduced inaccurately as grey or as a warm color, due to the presence of reflected red and infrared light, to which the color film is particularly sensitive.

In order to prevent this phenomenon, there has presently been adopted a modification method which uses a masking technique during retouching or printing. However, this process is difficult, requires substantial time, and the cost is high. As will be clearly understood from the foregoing drawings, if cloth or fabric which strongly reflects light at frequencies which are not readily sensed by the human eyes is photographed with color film, the color film senses this light more strongly than human eyes, so that cloth which is sensed as being green by the eye is photographically reproduced as a grey or warm color or fog.

SUMMARY OF THE INVENTION

The present invention has been achieved by providing a filter which retains the conventional characteristic ultraviolet ray absorption feature, while further acting to remove the above mentioned drawback, respecting the poor color reproduction of certain organic dyes.

An object of the invention is to provide a camera filter, in accordance with which blue fogging due to ultraviolet rays is prevented by using an ultraviolet ray absorbing filter as a substrate, and which blocks or greatly attenuates one portion of the red spectra by means of an evaporated film which absorbs light at wavelengths which are not preferable in the color reproduction of color film. Thus, the invention provides what is essentially a multi-layer filter or coated substrate filter which provides excellent photographic color reproduction of light at green or dark green wavelengths.

BRIEF DESCRIPTION OF THE DRAWINGS

FIG. 8 shows the spectral transmission factor curve of the ultraviolet ray absorbing substrate of the filter according to the present invention; and FIG. 9 illustrates the spectral transmission factor curves of a pair of evaporated films prepared according to the present invention as a second component of the filter of the invention.

DETAILED DESCRIPTION OF THE PREFERRED EMBODIMENTS

Embodiments of the present invention will hereinafter be explained with reference to the accompanying drawings and examples.

Figure 1:
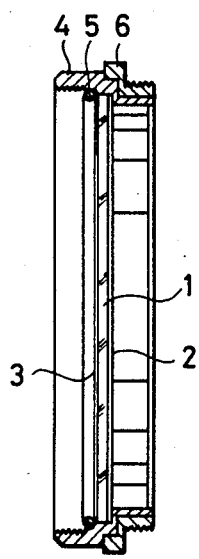
FIG. 1 is a cross-sectional view showing a filter in accordance with the present invention.
Figure 3:
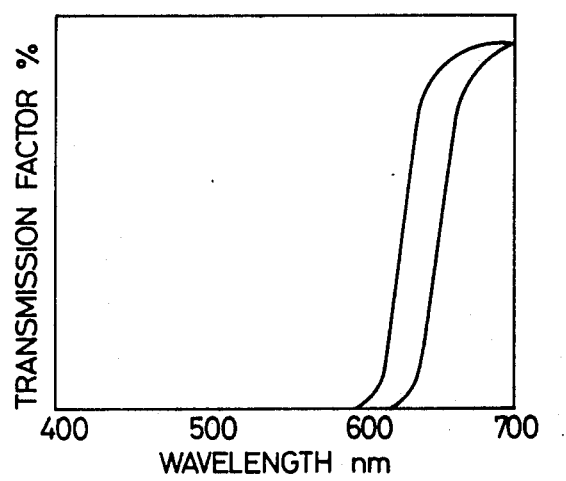
FIGS. 3 and 4 show spectral transmission factor curves of a conventional red transmission filter and a cyanic filter, respectively.

FIG. 1 is a cross-sectional view illustrating a filter formed in accordance with the present invention. The filter is comprised of an optical glass, plate glass or plastic substrate 1, on which is formed a multi-layer evaporated film 2. On the outside surface of the substrate 1 is provided a reflection preventing film 3. The composite structure of filter components 1 and 2 and reflection preventing film 3 is fitted into a frame body composed of a front frame 4, a rear frame 6 and a ring 5, which is constructed so as to be mountable to or detached from a conventional camera lens.

Figure 2:
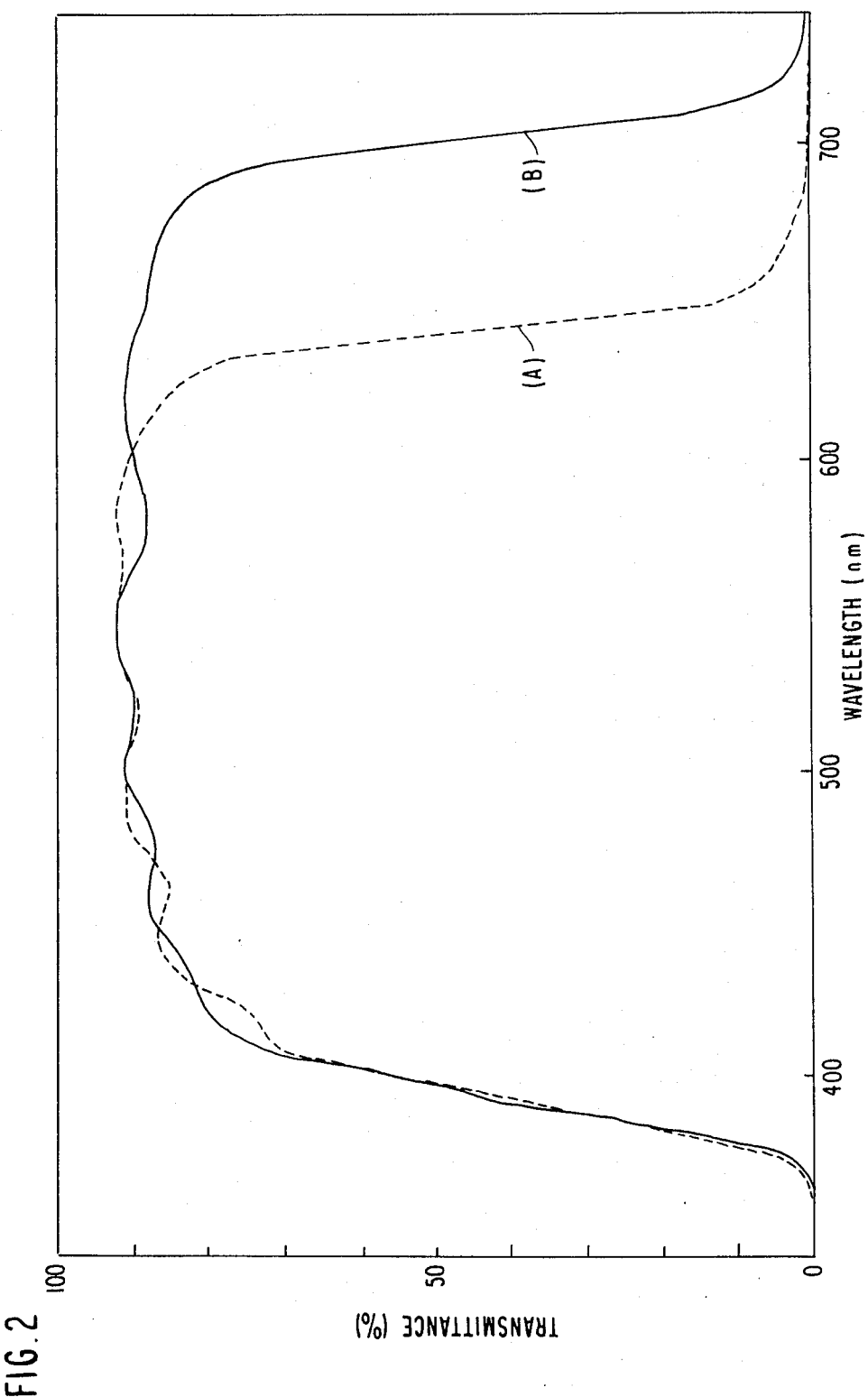
FIG. 2 shows spectral transmission factor curves of a pair of filters constructed according to the invention.
Figure 4:
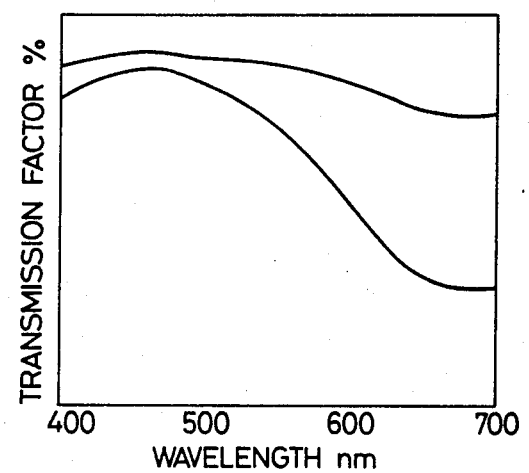
Figure 5:
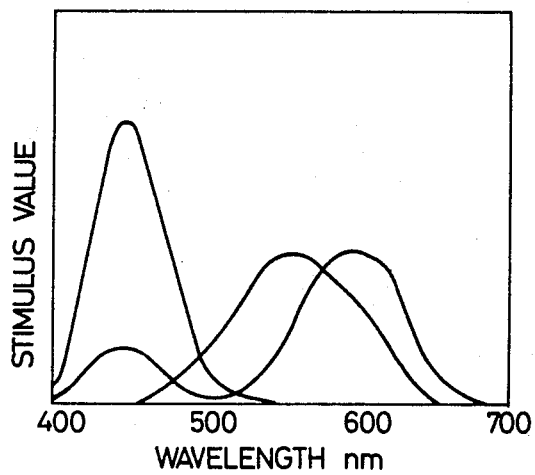
FIG. 5 shows the curves of the CIE spectral stimulus values, here representing human visual perception.
Figure 6:
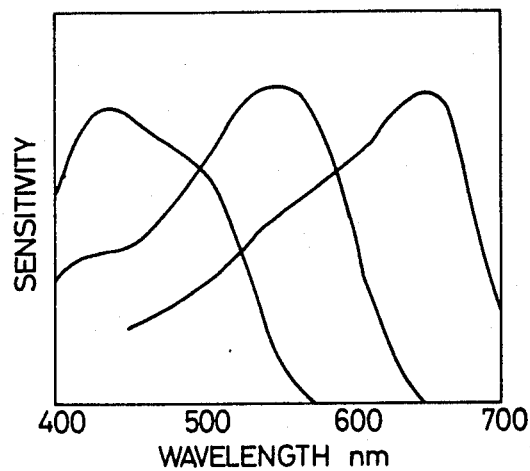
FIG. 6 shows the spectral sensitivity curves of the emulsion layers of a typical color film.
Figure 7:
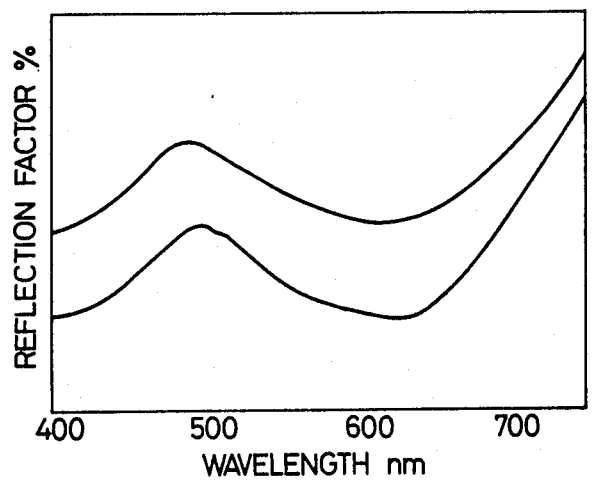
FIG. 7 shows the spectral reflection factor curves or characteristics of green cloth impregnated with a highly red-reflective organic dye.

The above described composite filter transmits blue light and green light and that portion of red light which is perceived by human eyes, but cuts or rapidly attenuates that red light having a wavelength above this value. The transmission characteristics of the composite filter are as shown in FIG. 2 of the present drawings. The spectral transmission characteristic of the ultraviolet ray absorbing substrate alone is shown in FIG. 8. The spectral transmission characteristics of the evaporated film alone is shown in FIG. 9 (two Examples A and B of the evaporated film are illustrated). If a filter having characteristics as shown in FIG. 2 is provided in front of a camera lens, that red light which is strongly reflected due to the presence of the aforementioned organic dyes is removed, so that the color film is not exposed to light which is not necessary to accurate photographic reproduction. Since the spectral sensitivity distribution differs depending on the type of color film, and since the spectral reflection factor curve also differs depending upon the particular type of organic dye, the spectral transmission factor curve of the filter of the present invention may be varied slightly in order to account for these differences, if desired. For consistent good quality photographic reproduction, the transmission factor characteristics will fall in the range between curves A and B shown in FIG. 2 and described below as specific examples of the invention.

Curve A of FIG. 2 illustrates the transmission factor characteristic of a filter which cuts the transmission factor of light at 640 nm to 50%. Between around 600 nm to 700 nm, the transmission factor is reduced in value by approximately 90%.

The present inventors have found that curve A in FIG. 2 represents approximately the maximum that can be obtained in terms of attenuating red light while maintaining proper color balance of the photograph. That is, spectral transmission characteristic curve A is that of a filter which reaches the limit in cutting light at the shorter wavelengths. On the other hand, solid line B in FIG. 2 illustrates the spectral transmission characteristic curve of a second filter according to the invention which cuts the transmission factor of rays having a wavelength of 700 nm by 50%. It is possible to remove the aforementioned reflected red and infrared light using a filter which reaches the 50% transmission factor at a wavelength greater than 700 nm, but in this case the practical effects of the filter are not obtained since the filter passes too much light at frequencies not perceived by human vision. Accordingly, the spectral transmission characteristic B is that of a filter which reaches a practical limit at the longer wavelength side.

It is impossible for a single element glass filter, plastic filter or gelatin filter to obtain the desired spectral transmission characteristics as shown in FIG. 2. It is thus required according to the invention for the filter to be a composite filter having an ultraviolet ray absorbing component (the substrate) and a red and infrared light attenuating component formed on the substrate. According to the invention, the latter component is formed as a multi-layer evaporated film which is disposed on one surface of the substrate in accordance with a vacuum evaporation method. The evaporated film is typically provided on the inside surface of the substrate, with the reflection prevention film 3 of single or multi-layer construction provided on the other or outside surface of the substrate, and deposited by means of a vacuum evaporation method.

Specific examples of the composition of the component parts of the filter of the present invention will now be described. An example of an ultraviolet ray absorbing glass substrate is as follows:

EXAMPLES

1. Composition of the Ultraviolet Ray Absorbing Substrate

| | |
|---|---|
| $SiO_2$ | 55 wt % |
| $Na_2O$ | 5 wt % |
| $K_2O$ | 5 wt % |
| PbO | 30 wt % |
| CeO | 5 wt % |

2. Composition of the Red Light Attenuating Film

Two Examples (A and B) of the evaporated film according to the invention will be given below. The evaporated film is provided as a multi-layer construction, having a plurality of layers which alternate in refractive index. In particular, in the Examples described below, the evaporated film is provided with sixteen discrete layers of alternating low and high refractive index films. Beginning with the air-side or outside of the filter, there is first provided a low refractive index film of one-half the nominal film thickness, which is followed by a high refractive index film of nominal thickness. Following this there are provided fourteen thin film layers which alternately have low and high refractive indices, respectively. All layers other than the first low refractive index film at the outside or air-side of the filter are of nominal thickness.

| (A) | | | (B) | | |
|---|---|---|---|---|---|
| Layer No. | Material | Optical Film Thickness (nm) | Layer No. | Material | Optical Film Thickness (nm) |
| 1 | $SiO_2$ | 90 | 1 | $SiO_2$ | 100 |
| 2 | $TiO_2$ | 180 | 2 | $TiO_2$ | 200 |
| 3 | $SiO_2$ | 180 | 3 | $SiO_2$ | 200 |
| 4 | $TiO_2$ | 180 | 4 | $TiO_2$ | 200 |
| 5 | $SiO_2$ | 180 | 5 | $SiO_2$ | 200 |
| 6 | $TiO_2$ | 180 | 6 | $TiO_2$ | 200 |
| 7 | $SiO_2$ | 180 | 7 | $SiO_2$ | 200 |

-continued

| | (A) | | | (B) | |
| --- | --- | --- | --- | --- | --- |
| Layer No. | Material | Optical Film Thickness (nm) | Layer No. | Material | Optical Film Thickness (nm) |
| 8 | TiO$_2$ | 180 | 8 | TiO$_2$ | 200 |
| 9 | SiO$_2$ | 180 | 9 | SiO$_2$ | 200 |
| 10 | TiO$_2$ | 180 | 10 | TiO$_2$ | 200 |
| 11 | SiO$_2$ | 180 | 11 | SiO$_2$ | 200 |
| 12 | TiO$_2$ | 180 | 12 | TiO$_2$ | 200 |
| 13 | SiO$_2$ | 180 | 13 | SiO$_2$ | 200 |
| 14 | TiO$_2$ | 180 | 14 | TiO$_2$ | 200 |
| 15 | SiO$_2$ | 180 | 15 | SiO$_2$ | 200 |
| 16 | TiO$_2$ | 180 | 16 | TiO$_2$ | 200 |
| Glass Base | | | Glass Base | | |

The spectral transmission characteristics of above films A and B are as shown in FIG. 8. The spectral transmission characteristics of above film Examples A and B, when combined with the ultraviolet ray absorbing substrate, are as shown in FIG. 2.

In accordance with the present invention as described above, there is formed an evaporated film on one surface of an ultraviolet ray absorbing filter, where by ultraviolet rays may be absorbed to prevent blue fogging due thereto. Blue light and green light are transmitted unaffected, while one portion of the red light spectrum is cut or attenuated so as to remove higher wavelength portions therefrom typically due to light reflected due to the presence of organic dyes and the like. According to the invention, the accuracy of color reproduction in color photography can be marketedly improved.

What is claimed is:

1. A camera filter, comprising; an ultraviolet ray absorbing member including a substrate, and an evaporated film which transmits blue light and green light but sharply attenuates a longer wavelength portion of red light, said evaporated film being formed on one surface of said substrate, and frame means for housing said substrate, said frame means being attachable to a camera.

2. The filter as claimed in claim 1, further comprising a reflection prevention layer on the surface of said substrate opposite the camera for preventing undesired reflections.

3. The filter as claimed in claim 2, wherein said frame comprises a front frame member, a rear frame member, and a ring member for retaining said subtrate between said front and rear frame members.

4. The filter as claimed in claim 1, wherein said evaporated film comprises a multi-layer formation having layers of alternately low and high refractive index.

5. The filter as claimed in claim 1, wherein said evaporated film has a transmission characteristic such that the wavelength of that light having a transmission factor of 50% falls within the range of 640 nm to 700 nm.

6. The filter as claimed in claim 1, wherein said evaporated film comprises a multi-layer formation having layers of alternately low and high refractive index, with a first, outer layer of said film having a low refractive index, and an innermost layer in contact with said substrate having a high refractive index.

7. The filter as claimed in claim 6, wherein said first layer of low refractive index has a thickness of one-half that of other layers of said film.

* * * * *